March 9, 1965     J. C. FICKLE     3,172,554
MATERIAL UNLOADER

Filed Dec. 13, 1963     3 Sheets-Sheet 1

INVENTOR.
J.C. FICKLE

BY William A. Murray

ATTORNEY

March 9, 1965  J. C. FICKLE  3,172,554
MATERIAL UNLOADER
Filed Dec. 13, 1963  3 Sheets-Sheet 2
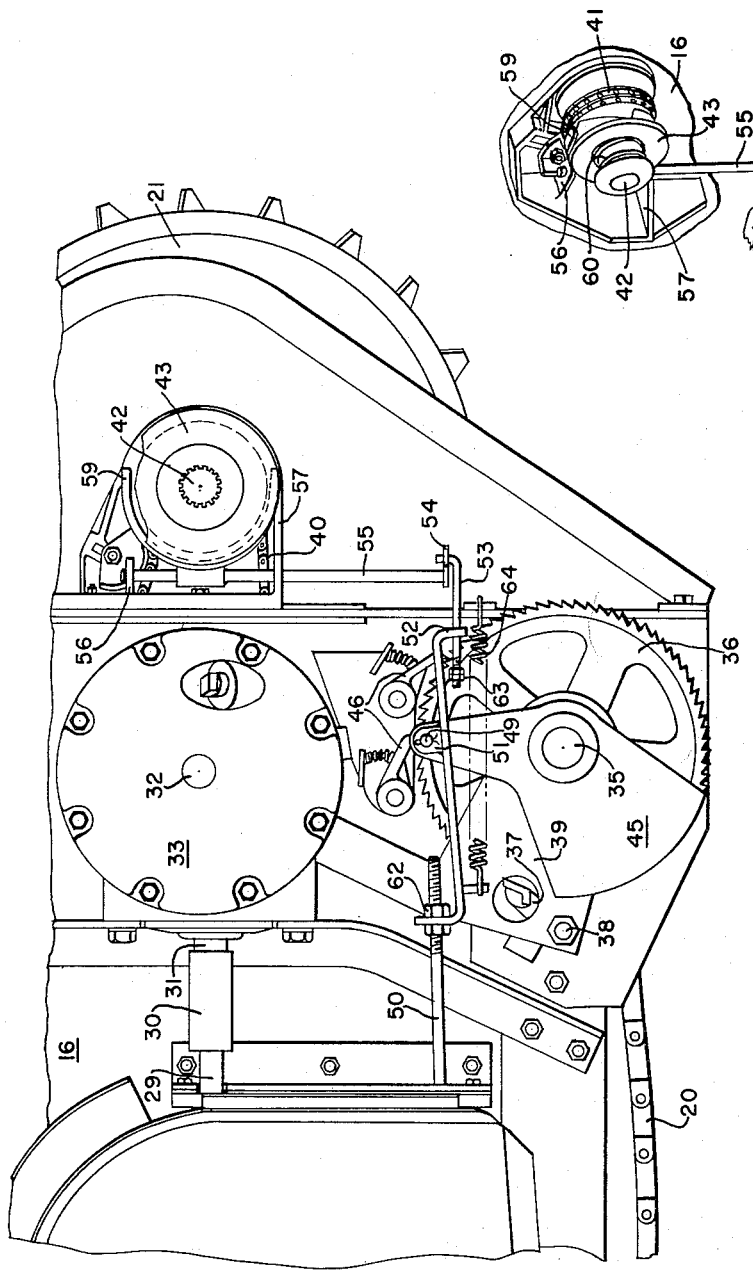
INVENTOR.
J.C. FICKLE
BY William A. Murray
ATTORNEY March 9, 1965 J. C. FICKLE 3,172,554
MATERIAL UNLOADER Filed Dec. 13, 1963 3 Sheets-Sheet 3

INVENTOR.
J.C.FICKLE
BY *William A. Murray*
ATTORNEY

United States Patent Office 3,172,554
Patented Mar. 9, 1965

3,172,554
MATERIAL UNLOADER
J. Clark Fickle, Moline, Ill., assignor to Deere & Company, Moline, Ill., a corporation of Delaware
Filed Dec. 13, 1963, Ser. No. 330,325
13 Claims. (Cl. 214—519)

This invention relates to a material unloader of the type having a main mobile container open at one end with a floor conveyor and a material spreading device at the open end. Still more particularly this invention relates to a drive mechanism and the control for the drive mechanism that operates the floor conveyor and the material distributing or spreading mechanism.

In a conventional type material unloader, such as a manure spreader, there is normally provided a material containing box having a floor and upright front and opposite sides that opens rearwardly. The box has a floor conveyor that moves material rearwardly to the open end of the box. There is provided a material distributing or discharge mechanism at the open rear end that spreads, shreds, and reduces the material as it is being discharged. In this type of material unloader, it is often desirable to operate the floor conveyor independently of the material distributing mechanism. It is particularly desirable to operate the floor conveyor in a cleanout operation or at a time in which the manure or other material is almost completely removed and it is only desirable to remove the remnants of the material left in the box. In many instances under these latter conditions, the distributing mechanism at the rear of the box will tend to throw material back into the box as the conveyor moves rearwardly. Consequently it has been found to be practical to completely shut off the operation of the material distributing mechanism and to operate the floor conveyor at a relatively high rate of movement for the cleanout operation.

With the above in mind, it is a primary object of the present invention to provide a drive mechanism from a single rotating element in the form of a drive shaft fixed to the side of the material container and connected to the material distributor by one drive means and to the floor conveyor by a second drive means. It is proposed to drive the floor conveyor by a pawl and ratchet drive and to control the rate of rotation of the floor conveyor by increasing or decreasing the effective pawl movement relative to the ratchet. Consequently a control is provided that adjusts the amount of throw of the pawl support and is also connected to a clutch mechanism in the drive for the distributing mechanism that becomes effective to throw out the clutch or the drive to the distributing mechanism upon the conveyor reaching its maximum speed.

It is a further object of the present invention to provide a control device for operating the aforementioned control member or element for the drives that is manually controlled and may operate to adjust the control member so that the floor conveyor will move by increments in its rates of speed. Specifically it is proposed to provide in the control device a lock for fixing the control at any desired predetermined rate of movement of the floor conveyor and to further provide an actuating device that sequentially operates the control for the floor conveyor and distributing mechanism. The lock for the control device is thrown out or disconnected to permit movement of the control portion of the device. In the form of the invention shown, the control device is composed in part of a ratchet, a locking pawl, and a drive pawl that is controlled by a remote source. The drive pawl underlies the locking pawl and consequently as the remote control moves the drive pawl, it will sequentially drive the ratchet upon initial movement thereof, and following the initial movement may, if the operator desires, then release the lock pawl. The drive pawl will move the ratchet in increments which will affect an increase in the rate of movement of the floor conveyor. If it is desired to further increase the rate of movement, the drive pawl is released to move back to its initial position and the remote control is again operated to further increase the speed. However, if at any time it is desired to move the control to a position in which the floor conveyor moves at a stop or minimum speed and the distributor is engaged with its driving mechanism, it is only necessary to force the drive pawl into a position that disengages the lock pawl. A biasing element is provided in the drive mechanism for forcing or automatically moving the respective drive mechanisms for the distributor and floor conveyor into a position in which the drive mechanism is engaged with the distributor and the floor conveyor is moving at a minimum rate of speed.

Other objects and advantages of the invention will become apparent to those skilled in the art as the nature of the invention is better understood from the following description and as shown in the accompanying drawings.

FIG. 3 is an enlarged view, with housing portions removed, showing the rear drive mechanism for the material unloader.

FIG. 4 is a perspective view showing the clutch mechanism incorporated in the drive of the rear material distributor.

Figure 1:
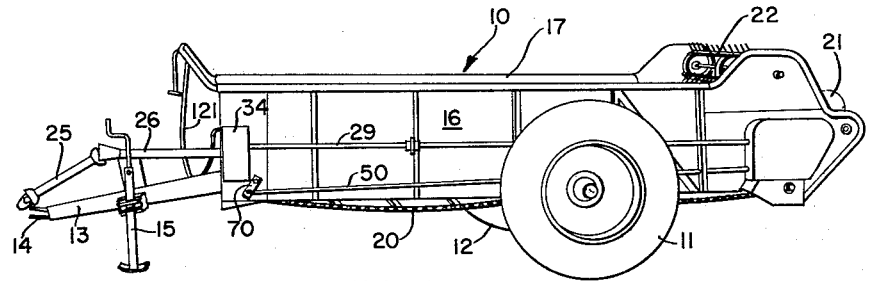
FIG. 1 is a side view of a material unloader incorporating the features of the invention.
Figure 2:
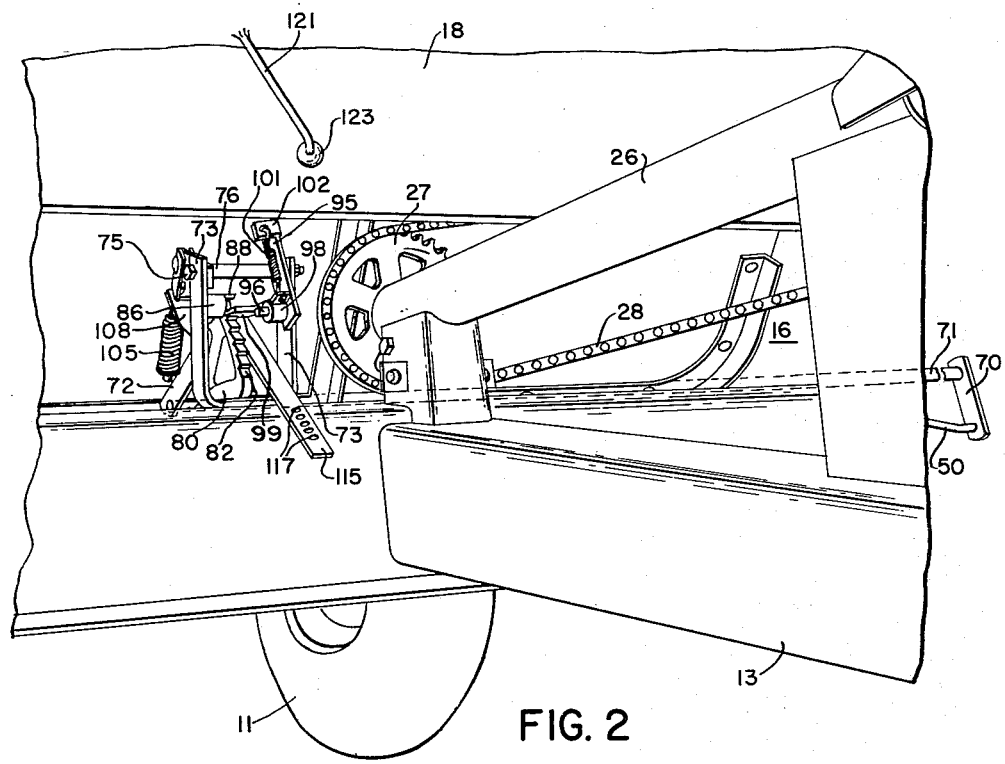
FIG. 2 is a front perspective view showing a portion of the control mechanism and a portion of the front of the material unloader, the latter having panels removed for purposes of showing internal mechanism.

The material unloading implement is in most respects similar to other types of manure spreaders having a main container 10 carried on a pair of support wheels 11, 12 and having a forwardly projecting tongue or draft device 13 adapted, as at 14, for connection to and support on a tractor drawbar. The tongue 13 is rigid with the container 10 and is supported, when the spreader is not in use by a jack 15. The container 10 has opposite longitudinally extending side walls 16, 17, and a forward transverse wall structure 18 projecting upwardly from the edges of a floor, not shown. The container 10, is therefore, other than the material distributing and conveying device, yet to be explained, open at its rear end for discharge of material.

Power for operating a first material handling mechanism in the form of a floor conveyor 20 and a second material handling mechanism in the form of a distributing beater 21 and a separating beater 22 at the rear of the material container, is received from the power take-off shaft of a tractor, not shown, through a conventional type drive shaft 25 connected to an intermediate fore-and-aft extending shaft, not shown, but carried in shielding 26 at the front of the material container. Supported on the latter shaft is a sprocket 27 having a chain 28 carried thereon and extending outwardly to a fore-and-aft extending shaft 29 carried on the outside of the side wall 17 and projecting rearwardly to a coupling 30 connected to an input shaft 31 extending inwardly to and drivingly connected to a transverse power shaft 32. The internal mechanism for operating the shaft 32 is not shown but is contained in a transmission housing 33. A sprocket supported on the forward end of the shaft 29 and drivingly connected to the chain 28 is not shown but its location is indicated by its shielding 34. The first material handling means or the floor conveyor 20 moves the material to the rear open end of the spreader and is carried on transversely spaced sprockets, not shown, mounted on a transverse shaft 35 extending across the container adjacent the rear edge of the floor. First drive means, in the form of a ratchet 36 carried on the shaft 35 and a drive pawl 37, operates to rotate the shaft 35 and the floor conveyor 20. The drive pawl 37 is pivotally mounted at 38 on a pawl carrier structure 39 pivotally mounted on the shaft 35 and eccentrically connected to the rotary drive element or shaft 32. Consequently as the shaft 32 rotates, the pawl 37 will move vertically and in its upward movement will engage the teeth on the ratchet 36 and rotate the shaft 35.

A second drive means extends from the rotary element or shaft 32 and is in the form of a chain and sprocket drive shown only partially by the chain 40 and sprocket 41. The sprocket 41 is carried on a transverse rotary shaft 42 that carries the rear widespread-beater combination 21. The second drive means may be disengaged from the shaft 42, a clutch mechanism, indicated in its entirety by the reference numeral 43, being inserted between the sprocket 41 and the shaft 42 for effecting a drive or no-drive relation between the second drive means and the second material handling element 21.

Referring again to the first drive means, the amount of throw of the ratchet 36 for each complete cycle of movement of the drive pawl 37 may be determined by a shoe structure 45 pivotally carried on the shaft 35 and adjustable to cover various of the teeth of the ratchet 36. Stop pawls 46 prevent rotation of the ratchet 36 in a reverse direction. The shoe structure 45 is controlled by a fore-and-aft rod 50, extending substantially the length of the side wall 16, and threaded at its rear end to be adjustably fixed to a metal strap 51 pivotally connected at 49 to a surface of the shoe 45. The strap 51 extends rearwardly from the shoe structure 45 and has a downwardly extending flange 52 with an opening therein for receiving a second control rod 53, the latter being connected to an arm 54 projecting outwardly from a vertical clutch control rod 55. The rod 55 is supported for swivel movement on the side wall 16 by means of brackets 56, 57. The rod 55 has a rearwardly projecting U-shaped clutch throwout element 59 that operates upon swiveling action of the rod 55 to disengage the clutch mechanism 43 and the second drive means to the beater distributor 21. A spring 60 is provided on the shaft 42 and biases the clutch 43 in normal engagement. Viewing FIG. 3, it becomes apparent that the control rod 53 in its relation to the bracket member 52 is such that lost motion is permitted so that the strap 51 may move the shoe 45 into various positions without affecting the drive relation of the clutch 43. Both the rods 50 and 53 have nuts 62, 63 respectively that permit adjustment of the effective length of those rods. However, it is normally desired to permit the adjustment of the shoe 45 in various increments to affect the speed of the floor conveyor 20 between a minimum rate and a maximum rate. This is accomplished by drawing the rod 50 forwardly until the maximum rate of movement occurs. From a practical standpoint this will occur when the shoe 45 and its overlying portion relative to the ratchet 36 is such that overlying portion will not engage the drive pawl in any manner and consequently the maximum bite of the ratchet may occur with the drive pawl 37. Also, as the rod 50 is drawn forward to obtain the maximum rate of movement of the floor conveyor 20, the flange 52 will contact the nut 63 and draw the second control rod 53 forwardly to disengage the clutch 43. Consequently by the single feature of drawing the control member or rod 50 forwardly the floor conveyor may be adjusted to various rates of movement and at the maximum rate of movement the throwout clutch 43 will disengage the operation of the distributor 21. A spring 64 extends between the strap 51 and wall 16 and generally biases the linkage 50, 51 rearwardly.

It should here be understood that the basic drive that includes the pawl and ratchet drive to the floor conveyor as well as the chain drive 41 to the distributing mechanism 21 is not new in the present invention but basically is old in several spreaders now on the market as well as is shown in several patents. However, the basic control mechanism as described is considered new and consequently emphasis is placed on this control mechanism. The basic description of the drive, while general, is believed sufficient for the environmental purposes to be described relative to the control mechanism. Also, while not shown, it should be understood, as is conventional, that the upper beater 22 is driven by a chain drive from the shaft 42 on the right-hand side or wall 17 of the spreader. This latter drive is generally conventional and it is not believed necessary to be shown or described in detail.

The forward end of the control rod 50 is connected to a lower end of an arm 70 at the forward end of the spreader. The arm 70 is fixed to a transversely extending rod 71 supported at its outer end by the wall 16 and at its inner end by a rearwardly projecting bracket 72 fixed to one leg of an upright U-shaped main support 73. The support 73 is welded to a top surface of a transverse beam 74 extending across the forward end of the spreader and behind the forward wall panel 18. The upper open ends of the legs of the U-shaped member 73 are interconnected by a bolt 75 that bridges the gap between the legs. Pivotally carried on the bolt 75 is a tube or pipe 76.

A rod control member in the form of a ratchet sector 80 is pinned at 81 to the rod 71. The sector 80 has teeth 82 facing forwardly. As may be seen from viewing the drawings, the location of the ratchet or control member 80 affects the fore-and-aft position of the control rod 50.

A lock pawl 85 has a hub portion 86 offset to one side of the ratchet 80 carried on a short stub pin 87 projecting inwardly from one leg of the U-shaped support 73 and a tooth engaging portion 88 adapted to engage the teeth 82. The pawl 85 has a spring 89 connected thereto with a lower end connected to the rearwardly extending bracket 72. The spring 89 normally biases the lock pawl 85 into engagement with the teeth 82.

A control arm 95, rigid with the tube or pipe 76, is pivotally supported on the bolt 75 adjacent the opposite leg portion of the U-shaped support 73. The arm 95 is normally offset to the opposite side of the ratchet 80. The lower end of the arm 95 carries a transversely extending stub pin 96 that pivotally receives a drive member or pawl 97. The drive pawl 97 has a hub 98 offset to the side of the ratchet teeth 82 and a drive end 99 engaging the teeth 82 of the ratchet 80. The drive pawl 97 is biased into engagement with the teeth 82 by means of a spring 101 extending between a lug 100 projecting from the hub 98 and a small bracket section 102 extending inwardly from an edge of the control arm 95.

The arm 95 is biased to a preset rearward position by means of a biasing force created by concentrically mounted springs 105, 106 on a rod 107. The spring 106, and when compressed the spring 105, bear against a rearwardly projecting bracket 108 fixed to a leg of the U-shaped support 73. The rod 107 extends through the bracket 108 and is rigidly secured to the bight portion of an upwardly extending U-shaped extension 109 having upwardly extending legs pivotally mounted at 110 to a rearwardly extending control arm 111 integral with the pipe 76. The biasing forces of the springs 105, 106 is therefore transferred to the pipe 76 and the arm 95. As will later become apparent, the springs 105, 106 operate also as a sensing device to sense different resistances in movement of the arm 95.

As previously mentioned, the location of the ratchet sector 80 determines the rate of movement of the floor conveyor 20 as well as the operation of the beater widespreads 21, 22. For purposes of having visual view of the location of the ratchet 80, there is provided a forwardly and downwardly projecting indicator member 115 that is pivoted at 116 to one side of the sector 80. The indicator 115 extends forwardly through the front wall structure 18 and has a series of openings 117. The openings 117 indicate by their relative position to the front wall structure 18 the exact position of the sector 80 and therefore the rate of movement of the floor conveyor and whether the distributing mechanisms 21, 22 are engaged.

The upper end of the arm 95 is provided with an eye structure 120 receiving the rear knotted end 122 of a flexible member or rope 121. The rope extends forwardly through a suitable fitting 123 in the forward wall structure 18 to a location available to an operator on a tractor. The rope 121 in conjunction with the arm 95 therefore may be controlled remotely relative to the spreader.

Figure 5:
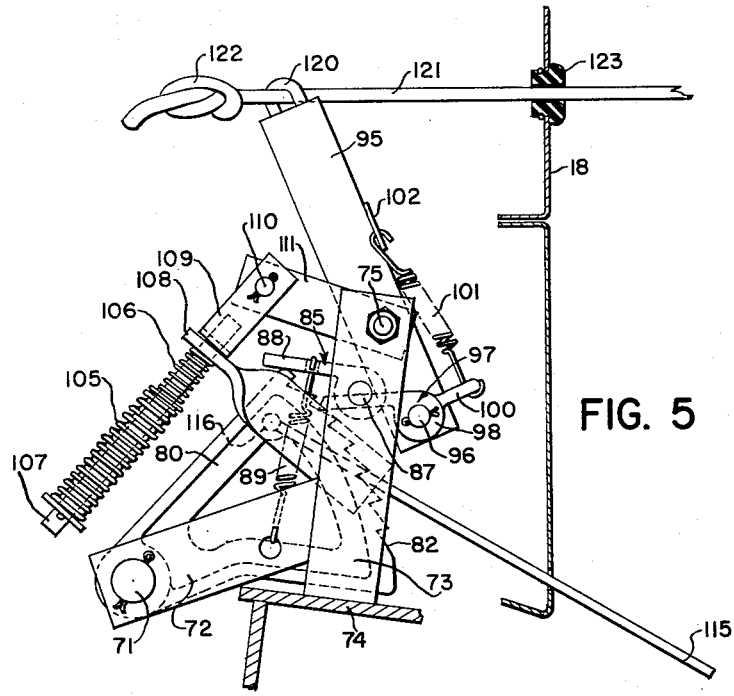
FIG. 5 is a side view of the control device for the drive mechanism.
Figure 6:
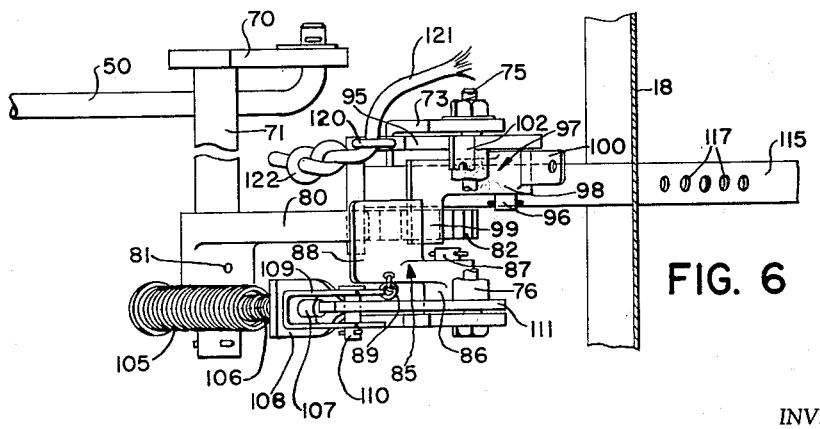
FIG. 6 is a plan view of the device shown in FIG. 5 with portions broken away to clearly show underlying mechanism.

The control structure operates in the following manner. As viewed in FIGS. 5 and 6 the control device is such that the floor conveyor 20 is moving at its minimum rate of speed and the clutch 43 is engaged. In order to increase the rate of movement of the floor conveyor 20, the arm 95 is drawn forwardly by the rope 121 and the drive pawl or member 97 engages the proper tooth in the ratchet wheel 80. The drive pawl drives the ratchet 80 rearwardly and would normally disengage from the teeth substantially at the same time the lock pawl 85 drops into engagement with a respective tooth for holding the ratchet or control member 80 in the moved position. Substantially at the time the lock pawl 85 engages the teeth, the drive portion 99 of the drive pawl 97 will be positioned under and closely adjacent the tooth engaging portion 88 of the lock pawl. This occurs also at the time that the spring 106 is compressed substantially to the length of the spring 105. Further movement of the arm 95 would therefore receive increased resistance by both springs 105, 106, and consequently the resistance to movement of the rope will increase. However, if it is desired to release the lock pawl 85, further forward movement of the arm 95 will cause engagement and raising of the tooth engaging portion 88 of the lock pawl and the spring 64 on the control rod 50 will force the unlocked sector 80 into the initial position. If, however, it is desired to retain the lock pawl 85 in engagement with the sector teeth 82, the rope 121 is slackened and the spring 106 forces the arm 95 into its original position and into a position where the drive pawl 97 is ready to engage the next tooth 82 of the sector 80. Consequently each forward movement of the arm 95 merely moves the sector 80 a short increment which in effect increases the rate of movement of the floor conveyor 20. As may be seen in FIG. 5, there are seven teeth in the sector 80 and the spacing between the adjacent teeth represents an increment increase in the rate of movement of the floor conveyor 80. The lowermost tooth does, when engaged by the drive pawl 97, indicate the maximum rate of movement. At the time that the drive pawl 97 is drawn by the rope 121 to move from the second lowest tooth and engages and drives the first lowest tooth, the flange 52 will engage the nut 63, the floor conveyor will move at the maximum rate of movement, and at the same time the clutch 43 will be disengaged from the distributing mechanism. The local pawl 85 will hold the control sector 80 in this position until it is desired to disengage the lock pawl in the manner previously explained.

While only one form of the invention has been shown, it should be recognized that other forms and variations will occur to those skilled in the art. Therefore while the preferred form has been shown for the purpose of completely illustrating the principles of the invention, there is no intention to limit or narrow the invention beyond the broad concepts set forth in the appended claims.

What is claimed is:

1. On a material unloader having an open end container and a material conveyor and discharge mechanism for moving material to and out of the open end, the invention comprising: a drive element; first drive means extending from the element to the discharge mechanism for operating the latter and being adjustable to effect a no-drive relation thereto; second drive means between the drive element and conveyor including a ratchet wheel and drive pawl; a control member associated with the second drive means adjustable to affect the rate of movement of the conveyor between minimum and maximum rates and connected to the first drive means to effect the no-drive relation at a maximum rate of movement of the conveyor; a biasing member connected to the adjustable control member for biasing the member toward a position effecting the minimum rate of movement of the conveyor; a ratchet sector pivoted on the container; means connecting the sector to the control member for effecting adjustment thereof in response to movement of the ratchet sector; a lock pawl pivoted on the container and engageable with the ratchet sector to resist the force of the biasing member; an arm pivoted on the container adjacent the ratchet sector; a drive pawl pivotally mounted on the arm and engageable with the ratchet sector and adapted to sequentially swing the ratchet sector a predetermined distance in response to initial movement of the arm and to release the lock pawl with further movement of the arm; a manual control connected to the arm; and a sensing device associated with the arm changing the resistance to movement of the arm as it moves between the aforesaid initial and further movements.

2. On a material unloader having an open end container and a material conveyor and discharge mechanism for moving material to and out of the open end, the invention comprising: a drive element; first drive means extending from the element to the discharge mechanism for operating the latter and being adjustable to effect a no-drive relation thereto; second drive means between the drive element and conveyor; a control member associated with the second drive means adjustable to affect the rate of movement by increments of the conveyor between minimum and maximum rates and connected to the first drive means to effect the no-drive relation at a maximum rate of movement of the conveyor; a biasing member connected to the adjustable control member for biasing the member toward a position effecting the minimum rate of movement of the conveyor; a ratchet sector pivoted on the container; means connecting the sector to the control member for effecting adjustment thereof in response to movement of the ratchet sector; a lock pawl pivoted on the container and engageable with the ratchet sector to resist the force of the biasing member; an arm pivoted on the container adjacent the ratchet sector; a drive pawl pivotally mounted on the arm and engageable with the ratchet sector and adapted to sequentially swing the ratchet sector a distance effecting an increment increase of the rate of movement of the conveyor in response to initial movement of the arm and to release the lock pawl with further movement of the arm; and a sensing means associated with the arm changing the resistance to movement of the arm as it moves between the aforesaid initial and further movements.

3. On a material unloader having an open end container and a material conveyor and discharge mechanism for moving material to and out of the open end, the invention comprising: a drive element; first drive means extending from the element to the discharge mechanism for operating the latter and being adjustable to effect a no-drive relation thereto; second drive means between the drive element and conveyor; a control member associated with the second drive means adjustable to affect the rate of movement by increments of the conveyor between minimum and maximum rates and connected to the first drive means to effect the no-drive relation at a maximum rate of movement of the conveyor; a ratchet sector pivoted on the container; means connecting the sector to the control member for effecting adjustment thereof in response to movement of the ratchet sector; a lock pawl pivoted on the container and engageable with the ratchet sector; an arm pivoted on the container adjacent the ratchet sector;

a drive pawl pivotally mounted on the arm and engageable with the ratchet sector and adapted to sequentially swing the ratchet sector a distance effecting an increment increase of the rate of movement of the conveyor in response to initial movement of the arm and to release the lock pawl with further movement of the arm; and a sensing means associated with the arm changing the resistance to movement of the arm as it moves between the aforesaid initial and further movements.

4. On a material unloader having an open end container and a material conveyor and discharge mechanism for moving material to and out of the open end, the invention comprising: a drive element; first drive means extending from the element to the discharge mechanism for operating the latter and being adjustable to effect a no-drive relation thereto; second drive means between the drive element and conveyor; a control member associated with the second drive means adjustable to affect the rate of movement by increments of the conveyor between minimum and maximum rates and connected to the first drive means to effect the no-drive relation at a maximum rate of movement of the conveyor; a ratchet sector pivoted on the container; means connecting the sector to the control member for effecting adjustment thereof in response to movement of the ratchet; a lock pawl engageable with the ratchet; a drive pawl supported on the container engageable with the ratchet and adapted to move in a path to sequentially swing the ratchet a distance effecting an increment increase of the rate of movement of the conveyor in response to initial movement of the drive pawl and to release the lock pawl with further movement of the drive pawl; a sensing means associated with the drive pawl changing the resistance to movement thereof as it moves between the aforesaid initial and further movements; and means automatically adjusting the drive means to effect a minimum rate of movement of the conveyor and operation of the discharge mechanism upon release of the lock pawl.

5. On a material unloader having an open end container and a material conveyor and discharge mechanism for moving material to and out of the open end, the invention comprising: a drive element; first drive means extending from the element to the discharge mechanism for operating the latter and being adjustable to effect a no-drive relation thereto; second drive means between the drive element and conveyor; a control member associated with the second drive means adjustable to affect the rate of movement by increments of the conveyor between minimum and maximum rates and connected to the first drive means to effect the no-drive relation at a maximum rate of movement of the conveyor; a ratchet sector pivoted on the container; means connecting the sector to the control member for effecting adjustment thereof in response to movement of the ratchet; a lock pawl engageable with the ratchet; a drive pawl supported on the container engageable with the ratchet and adapted to move in a path to sequentially swing the ratchet a distance effecting an increment increase of the rate of movement of the conveyor in response to initial movement of the drive pawl and to release the lock pawl with further movement of the drive pawl; and means automatically adjusting the drive means to effect a minimum rate of movement of the conveyor and operation of the discharge mechanism upon release of the lock pawl.

6. On a material unloader implement having a container with an open side therein and a material conveyor and discharge mechanism for moving material to the open side, the invention comprising: implement drive means on the container including a first drive operating the discharge mechanism and being adjustable between drive and no-drive conditions; and a second drive adjustable to affect by increments the rate of movement of the conveyor between minimum and maximum rates, the first and second drives being interconnected to effect the no-drive relation at a maximum rate of movement of the conveyor; a ratchet pivoted on the container; means connecting the ratchet to the drive means for effecting adjustment thereof in response to movement of the ratchet; a lock pawl supported on the container and engageable with the ratchet; a drive pawl engageable with the ratchet and supported on the container to move in a path to sequentially move the ratchet a distance effecting an increment adjustment in the rate of movement of the conveyor in response to initial movement thereof and to release the lock pawl with further movement thereof; a remote control means connected to the drive pawl for effecting movement in the path; and a sensing device associated with the drive pawl changing the resistance to movement thereof as it moves between the aforesaid initial and further movements.

7. On a material unloader implement having a container with an open side therein and a material conveyor and discharge mechanism for moving material to the open side, the invention comprising: implement drive means on the container including a first drive operating the discharge mechanism and being adjustable between drive and no-drive conditions and a second drive adjustable to affect by increments the rate of movement of the conveyor between minimum and maximum rates, the first and second drives being interconnected to effect the no-drive relation at a maximum rate of movement of the conveyor; a drive control member mounted on the container; means connecting the control member to the drive means for effecting adjustment thereof in response to movement of the control member; a lock element supported on the container and engageable with the control member to lock the first drive in a no-drive condition; a drive element engaging the control member and supported on the container to move in a path to sequentially move the control member a distance effecting an increment adjustment in the rate of movement of the conveyor in response to initial movement thereof and to release the lock element with further movement thereof and a remote control means connected to the drive element for effecting movement in the path.

8. The invention defined in claim 7 further characterized by biasing means supported on the container automatically effecting adjustment of the first drive to a drive condition and the second drive to effect a minimum rate of movement of the conveyor upon release of the lock element.

9. The invention defined in claim 7 further characterized by a sensing device operatively connected to the drive element and effecting a responsive sensitivity in the remote control means as the drive element moves between the aforesaid initial and further movements.

10. On an implement having a container and a material conveyor and treating mechanism, the invention comprising: implement drive means on the container including an adjustable first drive operating the treating mechanism, and a second drive adjustable to affect the rate of movement of the conveyor; a drive control member mounted on the container; means connecting the control member to the drive means for effecting adjustment thereof in response to movement of the control member; a lock element supported on the container and engageable with the control member to lock the drive means in a preadjusted condition; a drive element engaging the control member and supported on the container to move in a path to sequentially move the control member a distance effecting adjustment in the rate of movement of the conveyor in response to initial movement thereof and to release the lock element with further movement thereof and a remote control means connected to the drive element for effecting movement in the path.

11. On an implement having a housing and first and second material handling mechanisms, the invention comprising: drive means on the housing including an adjustable first drive operating the first mechanism, and an adjustable second drive for operating the second mechanism; a drive control member mounted on the housing;

means connecting the control member to the drive means for effecting adjustment thereof in response to movement of the control member; a lock element supported on the housing and engageable with the control member to lock the drive means in a preadjusted condition; a drive element engaging the control member and supported on the housing to move in a path to sequentially move the control member a distance effecting adjustment in the first of the drives in response to initial movement thereof and to release the lock element with further movement thereof; a remote control means connected to the drive element for effecting movement in the path; and a biasing member operatively associated with the drive means automatically adjusting the first and second drives to predetermined positions upon release of the lock element.

12. A control device for an implement having first and second material handling mechanism and adjustable first and second drive means therefor, comprising: a control member connected to the second drive means to affect adjustments thereof between minimum and maximum and connected to the first drive means to effect disengagement thereof from the first handling mechanism at the maximum adjustment of the second drive means; a biasing member connected to the adjustable member for biasing the member toward a position effecting the minimum adadjustent; a ratchet supported on the implement; means connecting the ratchet to the control member for effecting adjustment thereof in response to movement of the ratchet; a lock pawl pivoted on the container and engageable with the ratchet to resist the force of the biasing member; a drive pawl on the implement engageable with the ratchet and adapted upon movement to sequentially move the ratchet a predetermined distance of lesser amount than that required to adjust the first drive means between minimum and maximum in response to initial movement of the drive pawl and to release the lock pawl with further movement of the drive pawl; a remote control connected to the drive pawl; and a sensing device associated with the arm changing the resistance to movement of the arm as it moves between the aforesaid initial and further movement.

13. A control device for an implement having first and second material handling mechanism and adjustable first and second drive means therefor, comprising: a control member connected to the second drive means to affect adjustments thereof between minimum and maximum and connected to the first drive means to effect disengagement thereof from the first handling mechanism at the maximum adjustment of the second drive means; a biasing member connected to the adjustable member for biasing the member toward a position effecting the minimum adjustment; a ratchet supported on the implement; means connecting the ratchet to the control member for effecting adjustment thereof in response to movement of the ratchet; a lock pawl pivoted on the container and engageable with the ratchet to resist the force of the biasing member; a drive pawl on the implement engageable with the ratchet and adapted upon movement to sequentially move the ratchet a predetermined distance of lesser amount than that required to adjust the first drive means between minimum and maximum in response to initial movement of the drive pawl and to release the lock pawl with further movement of the drive pawl; and a remote control connected to the drive pawl.

References Cited by the Examiner
UNITED STATES PATENTS

| | | | |
|---|---|---|---|
| 2,296,474 | 9/42 | Kucera | 275—6 |
| 2,750,059 | 6/56 | Hintz et al. | 198—110 X |
| 2,797,795 | 7/57 | West | 198—110 X |
| 2,953,386 | 9/60 | McCarty | 275—6 |
| 3,014,729 | 12/61 | Henningsen et al. | 275—6 |
| 3,036,837 | 5/62 | Miller | 275—6 |

HUGO O. SCHULZ, *Primary Examiner.*